(12) United States Patent
Kato et al.

(10) Patent No.: US 8,634,123 B2
(45) Date of Patent: Jan. 21, 2014

(54) OPTICAL SCANNING DEVICE AND IMAGE FORMING APPARATUS

(75) Inventors: Ryota Kato, Nagoya (JP); Yasuo Tamaru, Nagoya (JP); Jun Mihara, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 585 days.

(21) Appl. No.: 12/209,985

(22) Filed: Sep. 12, 2008

(65) Prior Publication Data
US 2009/0073530 A1    Mar. 19, 2009

(30) Foreign Application Priority Data
Sep. 14, 2007   (JP) ................................. 2007-239157

(51) Int. Cl.
*G02B 26/08* (2006.01)
(52) U.S. Cl.
USPC ....................................................... 359/204.1
(58) Field of Classification Search
USPC ........................................... 359/196.1–226.3
See application file for complete search history.

(56) References Cited

U.S. PATENT DOCUMENTS

| | | | |
|---|---|---|---|
| 5,671,077 A * | 9/1997 | Imakawa et al. ........... | 359/204.1 |
| 6,919,978 B2 | 7/2005 | Kudo | |
| 7,031,039 B2 | 4/2006 | Takayama | |
| 7,057,782 B2 | 6/2006 | Kudo | |
| 7,224,503 B2 | 5/2007 | Takayama | |
| 2004/0189789 A1 * | 9/2004 | Ishibe ........................... | 347/243 |
| 2005/0024481 A1 | 2/2005 | Takayama | |
| 2006/0055995 A1 | 3/2006 | Takayama | |
| 2006/0139715 A1 | 6/2006 | Tamaru et al. | |
| 2007/0159674 A1 * | 7/2007 | Tomita .......................... | 359/201 |

FOREIGN PATENT DOCUMENTS

| | | |
|---|---|---|
| JP | 05-313086 A | 11/1993 |
| JP | 2003-107841 A | 4/2003 |
| JP | 2003-185952 A | 7/2003 |
| JP | 2003-287699 A | 10/2003 |
| JP | 2004-021171 A | 1/2004 |
| JP | 2004-205938 A | 7/2004 |
| JP | 2004-258173 A | 9/2004 |
| JP | 2005-062834 A | 3/2005 |
| JP | 2006-171317 A | 6/2006 |
| JP | 2006-178372 A | 7/2006 |
| JP | 2006-313268 A | 11/2006 |
| JP | 2007-112061 A | 5/2007 |
| JP | 2008-112041 A | 5/2008 |

OTHER PUBLICATIONS

JP Office Action dtd Jul. 19, 2011, JP Appln. 2007-239157, English translation.

* cited by examiner

*Primary Examiner* — Jennifer L. Doak
(74) *Attorney, Agent, or Firm* — Banner & Witcoff, Ltd.

(57) ABSTRACT

An optical scanning device is configured to cause a light beam to scan a photosensitive drum to form a latent image on the photosensitive drum. The optical scanning device includes light emitting units configured to emit light beams and a light deflecting unit having deflecting surfaces and being configured to cause the light beams emitted from the light emitting units to reflect at the deflecting surfaces and deflect and scan in a main scanning direction. Also, the device includes a lens disposed between the light emitting units and the light deflecting unit, the lens being configured to cause the light beams emitted from the light emitting units to be directed along the main scanning direction to the deflecting surfaces, and an aperture member disposed between the lens and the light deflecting unit, and having apertures formed in line in a sub scanning direction perpendicular to the main scanning direction.

16 Claims, 9 Drawing Sheets

OPTICAL SCANNING DEVICE AND IMAGE FORMING APPARATUS

CROSS REFERENCE TO RELATED APPLICATION

This application claims priority from Japanese Patent Application No. 2007-239157, filed on Sep. 14, 2007, the entire subject matter of which is incorporated herein by reference.

FIELD

Aspects of the invention relate to an optical scanning device and an image forming apparatus.

BACKGROUND

An optical scanning device includes a light emitting portion, an aperture member formed with apertures, a cylindrical lens, and a polygon mirror. In the optical scanning device, laser beams emitted from the light emitting portion pass through the apertures formed in the aperture member, which restrict their beam width. Then, the laser beams pass through the cylindrical lens, are collected on and are reflected by the rotating polygon mirror, are deflected in a main scanning direction and scanned on a photosensitive member.

SUMMARY

Aspects of the invention provide an optical scanning device configured to prevent stray light generated in a lens (e.g., cylindrical lens) from entering a polygon mirror, and an image forming apparatus including such an optical scanning device.

BRIEF DESCRIPTION OF THE DRAWINGS

Illustrative aspects of the invention will be described in detail with reference to the following figures in which like elements are labeled with like numbers and in which.

DETAILED DESCRIPTION

Figure 1:
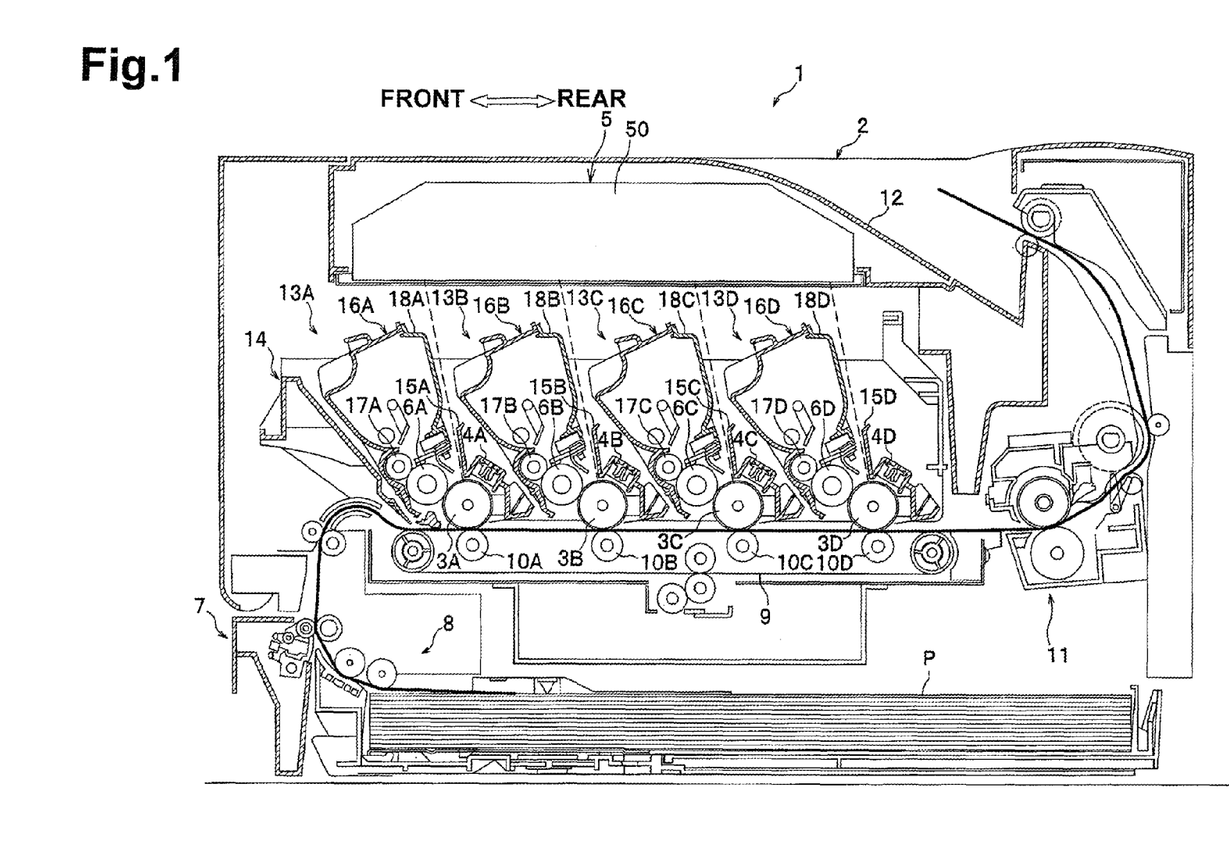
FIG. 1 is a side sectional view of an internal structure of a color laser printer as an illustrative example of an image forming apparatus according to an illustrative embodiment of the invention.

An illustrative embodiment of the invention will be described in detail with reference to the accompanying drawings. An image forming apparatus according to aspects of the invention applies to a color laser printer 1 as shown in FIG. 1. It will be appreciated that aspects of the invention apply to other types of image forming apparatuses as well.

For ease of discussion, in the following description, the top or upper side, the bottom or lower side, the left or left side, the right or right side, the front or front side, and the rear or rear side are used to define the various parts when the color laser printer 1 is disposed in an orientation in which it is intended to be used. In FIG. 1, the right side is referred to as the rear or the rear side, the left side is referred to as the front or front side, the up side is referred to as the top or upper side, and the down side is referred to as the bottom or lower side.

As shown in FIG. 1, the color laser printer 1 may include, in a main body 2, four photosensitive members, e.g., drums 3A, 3B, 3C, 3D, arranged in parallel in a front-rear direction. Surfaces of the photosensitive drums 3A, 3B, 3C, 3D are uniformly charged by corresponding scorotron chargers 4A, 4B, 4C, 4D, and then scanned by laser light emitted from an optical scanning device 5, such that electrostatic latent images are formed on the surfaces based on image data. The latent images are developed into toner images on the respective surfaces of the photosensitive drums 3A, 3B, 3C, 3D with developing agents or developers of each color, e.g., toner, which are carried on developing rollers 6A, 6B, 6C, 6D.

A stack of recording sheets P is stored in a sheet supply cassette 7 disposed in a lower portion of the main body 2. Each of the recording sheets P is singly conveyed toward a conveyor belt 9 by rollers in a sheet supply section 8 disposed in a front part of the sheet supply cassette 7. The conveyor belt 9 is disposed facing the photosensitive drums 3A, 3B, 3C, 3D. The toner images of colors carried on the photosensitive drums 3A, 3B, 3C, 3D are sequentially transferred on top of each other on the recording sheet P being conveyed on the conveyor belt 9 by actions of transfer rollers 10A, 10B, 10C, 10D to which transfer bias is applied. The transfer rollers 10A, 10B, 10C, 10D are disposed facing the photosensitive drums 3A, 3B, 3C, 3D via the conveyor belt 9. The recording sheet P having the toner images thereon is fixed by heat and pressure in a fixing unit 11 disposed to the rear of the photosensitive drum 3D, and ejected to an ejection tray 12 disposed on top of the main body 2 while a direction in which the recording sheet P is conveyed is changed from rear to front by rollers.

The process cartridges 13A, 13B, 13C, 13D are disposed between the sheet supply cassette 7 and the optical scanning device 5 in the main body 2, and arranged in the front-rear direction. The process cartridges 13A, 13B, 13C, 13D are placed in a frame 14, which is configured to be attached to and removed from the main body 2. The process cartridges 13A, 13B, 13C, 13D can be configured to be attached to and removed from the frame 14.

The process cartridges 13A, 13B, 13C, 13D may be identical in structure, but with different colors of toner. Each process cartridge 13A, 13B, 13C, 13D may include a housing 15A, 15B, 15C, 15D constituting an outer frame, the scorotron charger 4A, 4B, 4C, 4D, and a developing cartridge 16A, 16B, 16C, 16D. Each developing cartridge 16A, 16B, 16C, 16D is configured to be attached to and removed from a corresponding process cartridge 13A, 13B, 13C, 13D. Each developing cartridge 16A, 16B, 16C, 16D may include a corresponding developing roller 6A, 6B, 6C, 6D, supply roller 17A, 17B, 17C, 17D, and toner hopper 18A, 18B, 18C, 18D. Toner is stored in the toner hoppers 18A, 18B, 18C, 18D.

Figure 2:
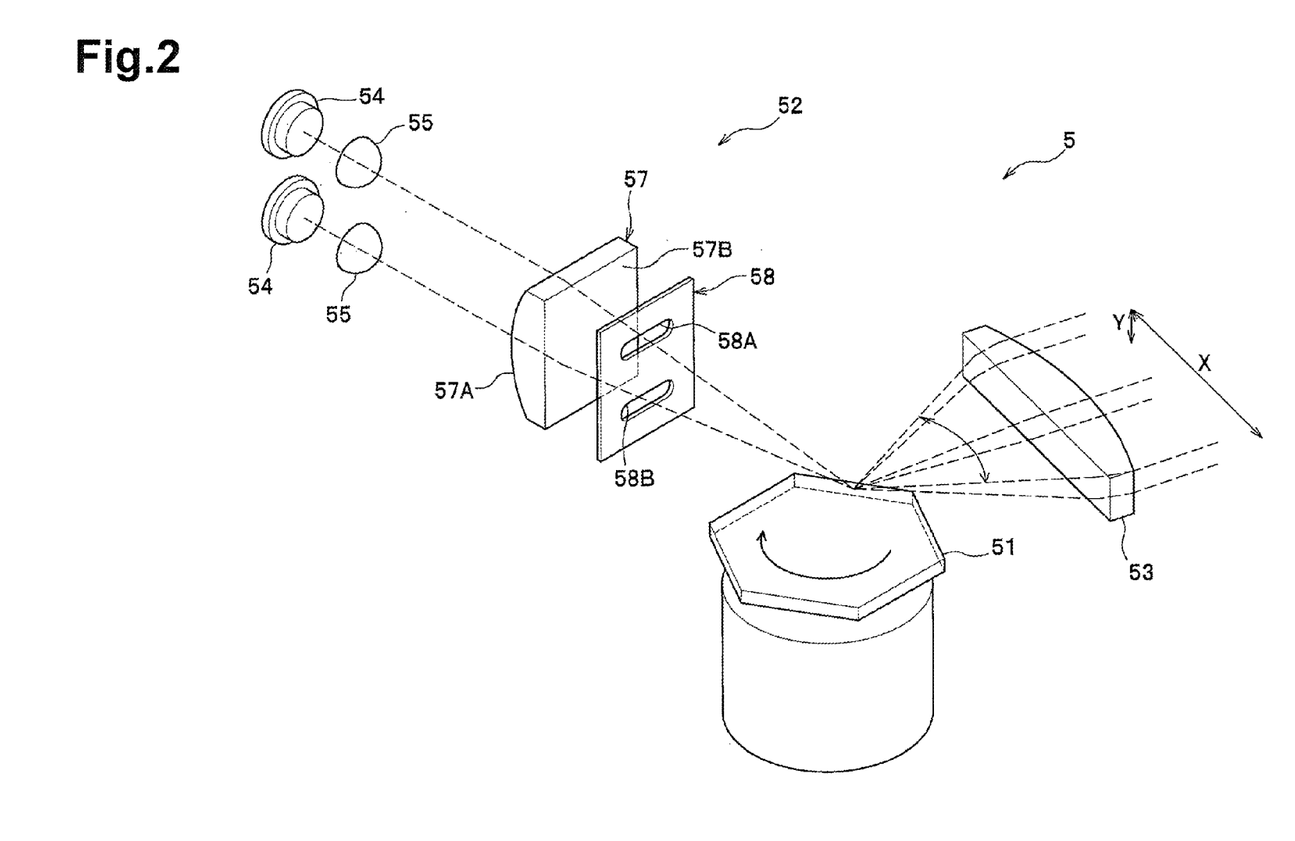
FIG. 2 is a perspective view of an optical scanning device.

As shown in FIG. 2, the optical scanning device 5 may include a polygon mirror 51, two optical portions 52 (only one shown), and two fθ lenses 53 (only one shown), which are all arranged in a housing 50 disposed in an upper portion of the main body 2 (FIG. 1). The optical portions 52 are disposed symmetrically with respect to the polygon mirror 51. The fθ lenses 53 are disposed in correspondence with the optical portions 52 and symmetrically with respect to the polygon mirror 51. Each optical portion 52 may include two laser light emitting portions 54, two collimating lenses 55, a cylindrical lens 57, and an aperture member 58.

The laser light emitting portions 54 may be, for example, semiconductor lasers, which are arranged in line along a sub scanning direction Y.

The collimating lenses 55 may be convex lenses made of a material, such as resin and glass, and arranged in line along the sub scanning direction Y and placed in correspondence with the laser light emitting portions 54. The collimating lenses 55 are configured to pass laser light emitted from the laser emitting portion 54 therethrough to convert the laser light into a beam of parallel rays.

The cylindrical lens 57 is configured to collect laser light emitted from each laser emitting portion 54 in the sub scanning direction Y and direct the light to the polygon mirror 51, in order to correct optical face angle error of the polygon mirror 51. The cylindrical lens 57 has an incident surface 57A, which is convex, and an emission surface 57B, which is flat. The cylindrical lens 57 is disposed between the laser light emitting portions 54 and the polygon mirror 51 on a downstream side of the collimating lenses 55 in a direction where the laser light travels (hereinafter referred to as a light travel direction). Specifically, the cylindrical lens 57 refracts the laser light having passed through the collimating lens 55 in the sub scanning direction Y, and directs the refracted light to a deflecting surface (or a reflector) of the polygon mirror 51 along a main scanning direction X.

The aperture member 58 is a generally rectangular flat plate, and is disposed between the cylindrical lens 57 and the polygon mirror 51. The aperture member 58 can have two apertures, e.g., slits, 58A, 58B which are long in the main scanning direction X, formed in line along the sub scanning direction Y, and spaced away from each other by an interval corresponding to an interval between the laser light emitting portions 54. The aperture member 58 is configured to pass the laser light emitted from the cylindrical lens 57 through the apertures 58A, 58B to regulate, e.g., restrict, a width of the laser light at least in the sub scanning direction Y.

Figure 3:
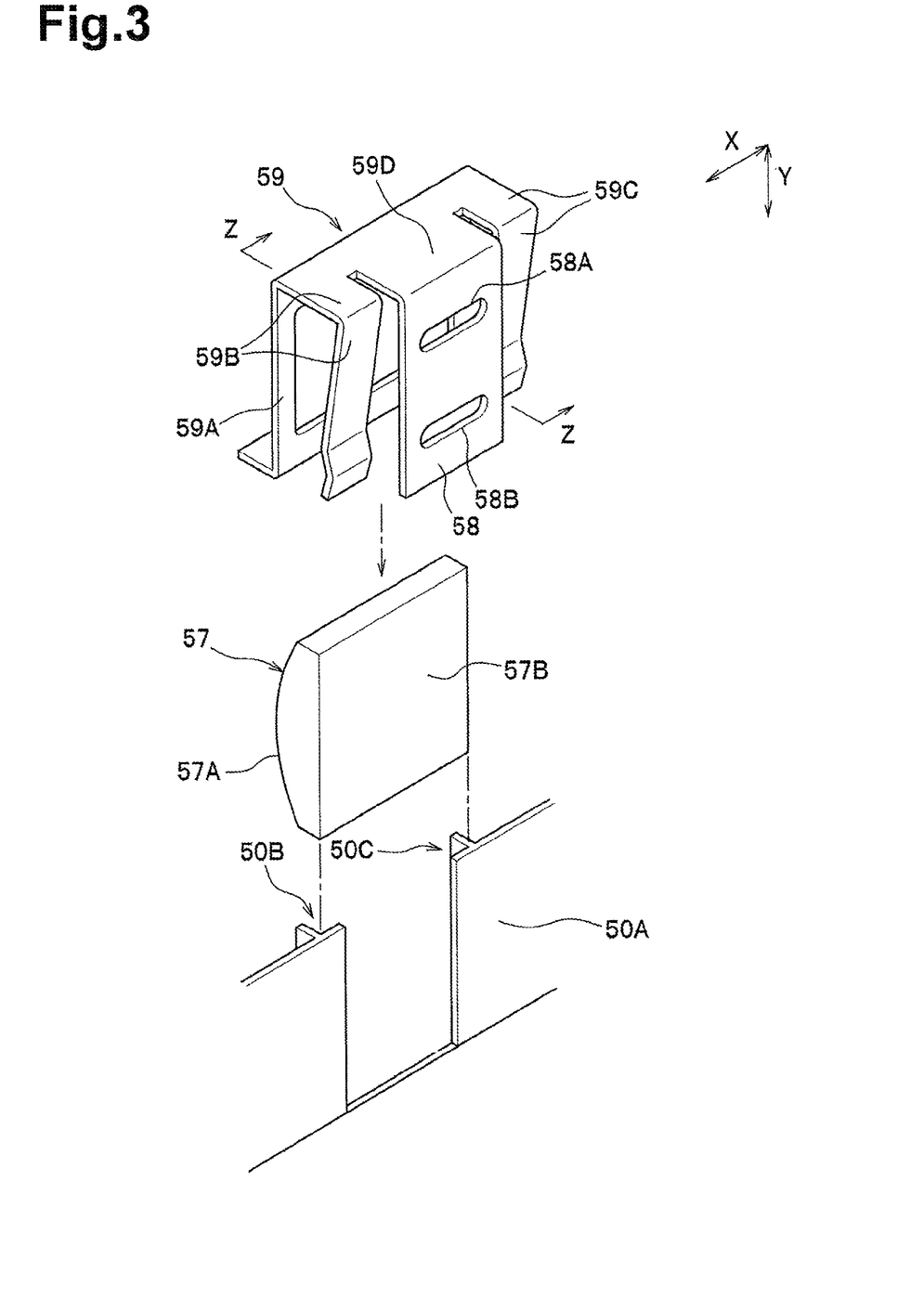
FIG. 3 is a perspective view of an aperture member, a holding member, a cylindrical lens and part of a housing.

As shown in FIG. 3, the aperture member 58 is integrally formed with a holding member 59 by sheet-metal working. The holding member 59 is configured to hold the cylindrical lens 57 therein. The holding member 59 includes a base 59A, holding portions 59B, 59C, and a connecting portion 59D. The base 59A is located on an upstream side in the light travel direction. The holding portions 59B, 59C extend generally horizontally from an upper portion of the base 59A to a downstream side in the light travel direction, and bend downward at generally a right angle. The connecting portion 59D extends generally horizontally from the upper portion of the base 59A to the downstream side in the light travel direction and connects with an upper portion of the aperture member 58.

Figure 4:
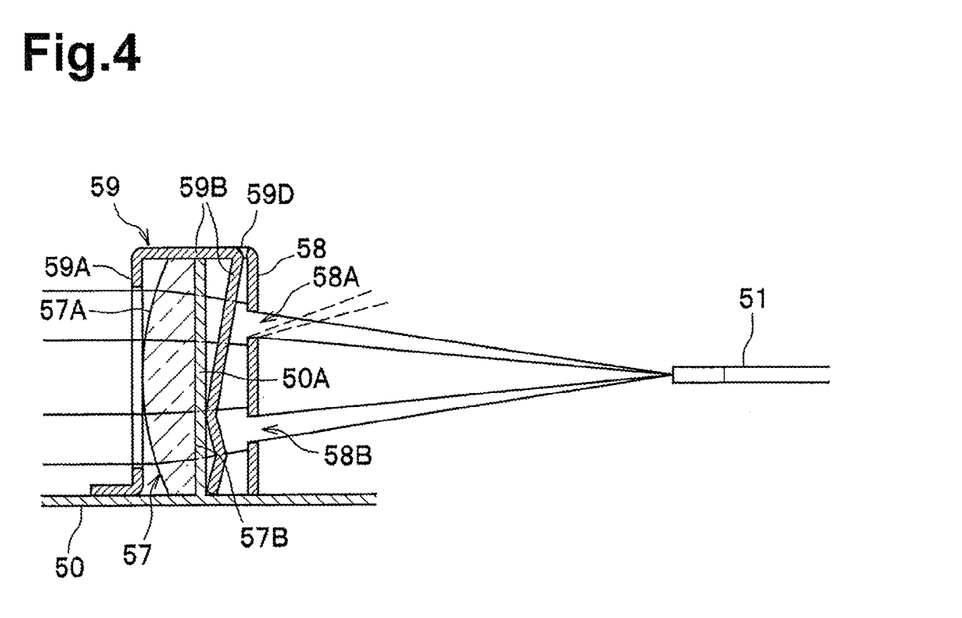
FIG. 4 is a cross sectional view taken along a line Z-Z of FIG. 3.

As shown in FIG. 4, the cylindrical lens 57 is held against a wall 50A formed in the housing 50 of the optical scanning device 5 in the holding member 59. More specifically, both sides of the cylindrical lens 57 in the main scanning direction X are engaged with guides 50B, 50C (FIG. 3) formed on the wall 50A, both sides of the incident surface 57A in the main scanning direction X are supported by both sides of the base 59A, and both sides of the emission surface 57B in the main scanning direction X are supported by the holding portions 59B, 59C via the wall 50A, so that the cylindrical lens 57 is held in the holding member 59.

The holding portions 59B, 59C are formed to function as a leaf spring. When the holding member 59 holds the cylindrical lens 57 therein, the holding portions 59B, 59C spread toward the downstream side in the light travel direction, and urges the cylindrical lens 57 against the base 58 toward the upstream side in the light travel direction. Thus, the cylindrical lens 57 is firmly held between the base 59A and the holding portions 59B, 59C in the holding member 59. As shown in FIG. 3, the base 59A and the wall 50A each have an opening that permits the laser light to pass through, so as not to cut off the laser light through the cylindrical lens 57.

As shown in FIG. 2, the polygon mirror 51 is in the form of a polyhedron, e.g., a hexahedron, having a series of flat deflecting surfaces, e.g., reflective surfaces, around a perimeter thereof. The polygon mirror 51 is driven for rotation at high speed, to cause the laser light having passed through the apertures 58A, 58B of the aperture member 58 to reflect at the reflective surfaces and cause the reflected laser light to deflect or scan in the main scanning direction X. As laser beams emitted from the optical portion 52 enter the rotating polygon mirror 51 at different angles, they are reflected at the reflective surfaces of the polygon mirror 51 at different angles so that they are spaced in the sub scanning direction Y.

The fθ lens 53 is configured to convert the laser light scanned at a constant angular velocity by the polygon mirror 51 into laser light to be scanned at a constant velocity. The laser light emitted from the fθ lens 53 is reflected at or passes through reflective mirrors or lenses (not shown) provided in the housing 50 to change the light travel direction, passes through an opening (not shown) formed in a lower portion of the housing 50, converges and is scanned on each photosensitive drum 3A, 3B, 3C, 3D to form an image.

While laser light passes through a cylindrical lens, some of the laser light may become stray light due to internal reflection, and the stray light may be emitted from an emission surface of the cylindrical lens. The stray light may go to the polygon mirror, be reflected on the polygon mirror, reach the photosensitive member, and cause a ghost image, which may deteriorate image quality.

However, the optical scanning device 5 described above includes the aperture member 58 that is disposed between the cylindrical lens 57 and the polygon mirror 51. Stray light generated at the cylindrical lens 57 can be obstructed by a surface of the aperture member 58 except for the apertures 58A, 58B, and prevented from entering the polygon mirror 51. With this structure, the amount of stray light reaching each photosensitive drum 3A, 3B, 3C, 3D can be reduced to prevent an occurrence of a ghost image, and thus deterioration of the quality of an image formed on the sheet P may be prevented.

The aperture member 58 and the holding member 59 are integrally made of sheet metal. They are manufactured at low cost and configured to easily maintain positional accuracy between the incident surface 57A and the emission surface 57B of the cylindrical lens 57 and the aperture member 58. The aperture member 58 can be formed by bending, downward at generally a right angle, a portion extending toward the downstream side in the light travel direction from the connecting portion 59D of the holding member 59. By changing a position to bend, the positional relationship between the cylindrical lens 57 and the aperture member 58 can be easily adjusted to improve the positional accuracy. In addition, the apertures 58A, 58B can be arranged at positions equidistant from each laser light emitting portion 54.

In the illustrative embodiment, when the aperture member 58 has a thickness in the light travel direction, stray light generated at the cylindrical lens 57 shown by dashed lines in FIG. 4 may be reflected at inner walls defining the apertures 58A, 58B in the aperture member 58 and reach the photosensitive drums 3A, 3B, 3C, 3D via the polygon mirror 51.

Figure 5:
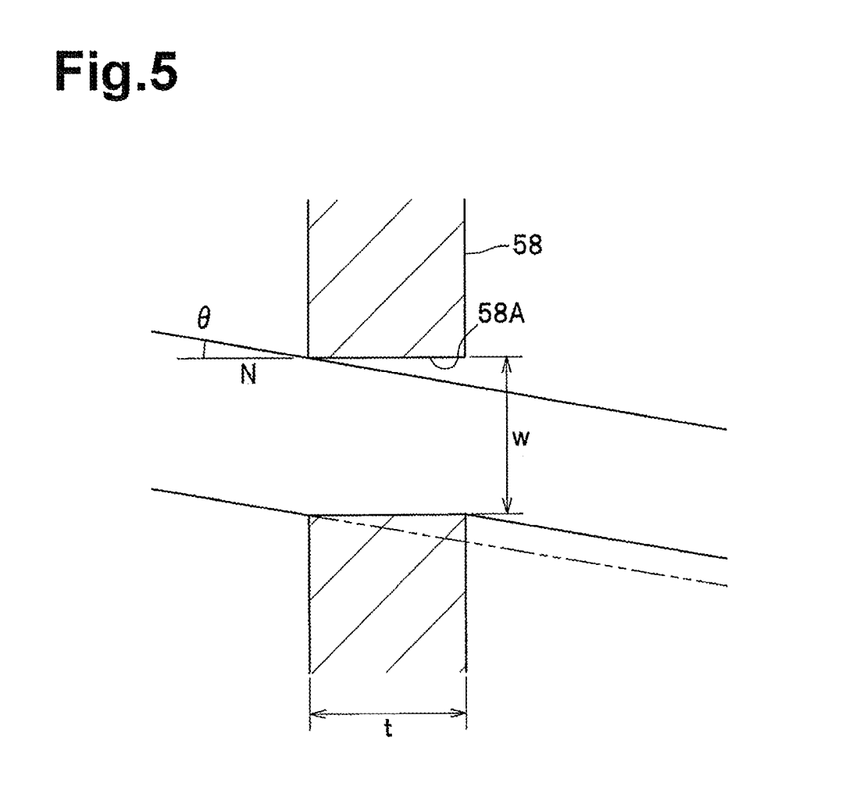
FIG. 5 is an enlarged cross sectional view of the aperture member.

In FIG. 5, t is the thickness of the aperture member 58, w is a width of the slit 58A in the sub scanning direction (or vertical direction in FIG. 5), N is a normal to a surface in which the slit 58A is formed, and θ is an incident angle between an optical axis of the laser light incident from the cylindrical lens 57 (FIG. 4) and the normal N.

The thickness of the aperture member 58 may satisfy the following expression: $t \cdot \sin \theta / w \leq 0.01$.

The expression "$t \cdot \sin \theta / w \leq 0.01$" indicates that a ratio of the laser light irradiated at the inner wall defining the slit 58A (inner lower wall in FIG. 5) to the laser light passing through the slit 58A is smaller than or equal to 1%.

The ratio of the laser light (stray light) irradiated at the inner wall defining the slit 58A to the laser light passing through the slit 58A can be made extremely small, so that the reflection of the stray light at the inner wall defining the slit 58A can be reduced, and the stray light can be prevented from entering the polygon mirror 51.

Alternatively, the aperture member 58 may be made sufficiently thin. When the aperture member 58 is sufficiently thin, the areas of the inner walls defining the apertures 58A, 58B, which serve as reflective surfaces for stray light, may become small and reflection of the stray light at the inner walls defining the apertures 58A, 58B may be efficiently reduced or prevented. The thickness of the aperture member 58 may be smaller than or equal to 0.3 mm. As the aperture member 58 may be formed by sheet-metal working, a thin and high-precision aperture member can be produced.

A first illustrative modification of the aperture member 58 will be described with reference to FIGS. 6 and 7.

Figure 6:
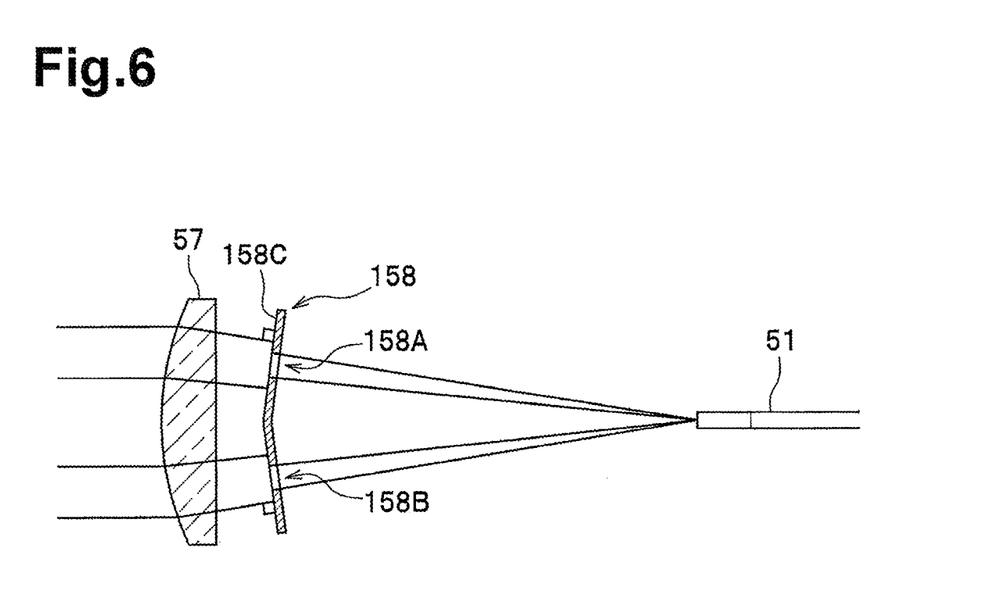
FIG. 6 is a cross sectional view of an aperture member and a cylindrical lens according to a first illustrative modification of the invention.

As shown in FIG. 6, an aperture member 158 has apertures, e.g., slits, 158A, 158B, and a surface 158C. The surface 158C is bent near the middle thereof with a slight angle so as to form a first surface portion and a second surface portion, the first and second surface portions being generally perpendicular to the optical axis of each laser light beam incident from the cylindrical lens 57. With this structure, inner walls defining the apertures 158A, 158B in the aperture member 158 are shaped parallel to the optical axis of the incident laser light. Thus, reflection of stray light at the inner walls defining the apertures 158A, 158B can be effectively reduced or prevented.

"To be generally perpendicular" does not mean that an angle between the surface 158C and the optical axis of the laser light is perfectly 90 degrees. It means that the angle between the surface 158C and the optical axis of the laser light includes allowable error. For example, the allowable error may include angles for which the following occur: stray light does not reach the photosensitive drums 3A, 3B, 3C, 3D even if laser light is reflected at the inner walls defining the apertures 158A, 158B; and the amount of stray light is so low that it has little effect on image quality even if the stray light reaches the photosensitive drums 3A, 3B, 3C, 3D.

Figure 7:
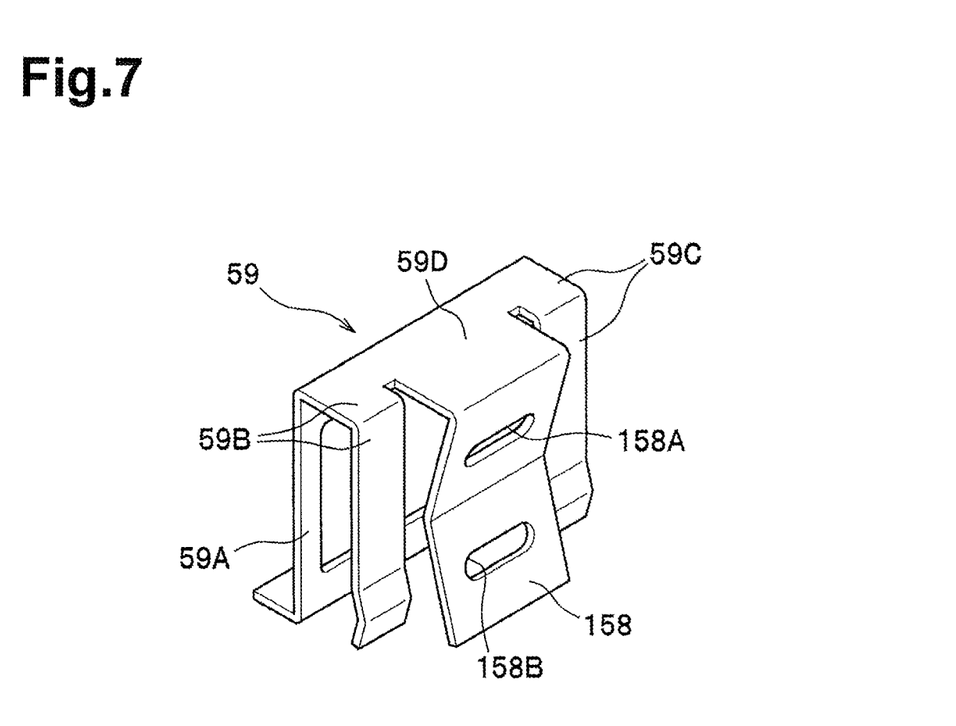
FIG. 7 is a perspective view of the aperture member and a holding member according to the first illustrative modification of the invention.

As shown in FIG. 7, the aperture member 158 of the first illustrative modification is also easily formable with the holding member 59 by metal-sheet working. By metal-sheet working, the aperture member 158 can be manufactured at low cost and the angle between the surface 158C and the optical axis of each laser light can be easily adjusted.

A second illustrative modification of the aperture member 58 will be described with reference to FIG. 8.

An aperture member 258, which is a second illustrative modification of the aperture member 58, is arc-shaped in cross section, in which the arc is centered on an image formation point (not shown) of the cylindrical lens 57. With this shape, as is the case with the aperture member 158 in the first illustrative modification, inner walls defining apertures, e.g., slits, 258A, 258B in the aperture member 258 are shaped parallel to the optical axis of laser light incident from the cylindrical lens 57. Thus, the reflection of stray light at the inner walls defining the apertures 258A, 258B can be effectively reduced or prevented. A third illustrative modification and a fourth illustrative modification of the aperture member 58 will be described with reference to FIGS. 9A and 9B.

Figure 9A:
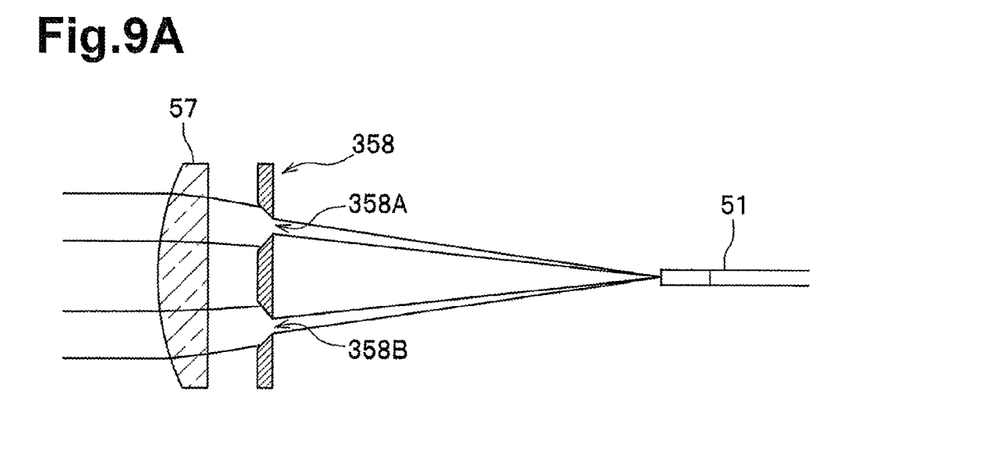
FIG. 9A is a cross sectional view of an aperture member and a cylindrical lens according to a third illustrative modification of the invention.
Figure 9B:
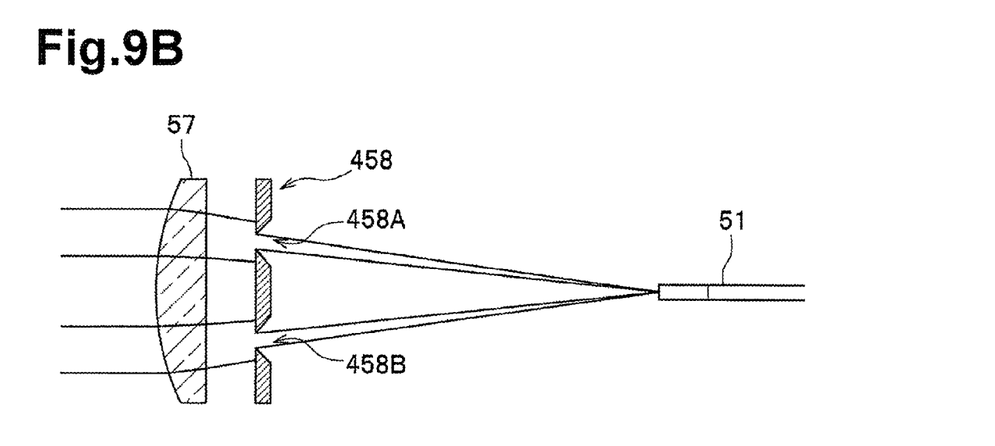
FIG. 9B is a cross sectional view of an aperture member and a cylindrical lens according to a fourth illustrative modification of the invention.

Aperture members 358, 458 according to the third and fourth illustrative modifications, respectively, are modified such that the inner walls defining the apertures 58A, 58B in the aperture member 58 are changed to have tapered shapes.

As shown in FIG. 9A, the aperture member 358 of the third illustrative modification has apertures, e.g., slits, 358A, 358B having inner walls that are tapered from the upstream side toward the downstream side (from left toward right in FIG. 9A) in the light travel direction. Much of stray light reflected at the inner walls defining the apertures 358A, 358B is reflected toward the upstream side in the light travel direction, that is, toward the cylindrical lens 57 disposed on a side of the aperture member 358 opposite the polygon mirror 51. Thus, the stray light incident to the polygon mirror 51 can be reduced.

As shown in FIG. 9B, the aperture member 458 of the fourth illustrative modification has apertures, e.g., slits, 458A, 458B having inner walls that extend from the upstream side toward the downstream side (from left toward right in FIG. 9B) in the light travel direction. From the viewpoint of incident angles of laser beams, stray light reflected at the inner walls defining the apertures 458A, 458B will generally disappear. Thus, as with the case where the aperture member is made sufficiently thin, this illustrative modification can effectively reduce or prevent reflection of stray light at the inner walls defining the apertures 458A, 458B.

In the above illustrative embodiment, the polygon mirror 51 is shown as an example of a light deflecting unit, the photosensitive drums 3A, 3B, 3C, 3D show an example of a photosensitive member, the transfer rollers 10A, 10B, 10C, 10D illustrate a transfer unit, and the developing cartridges 16A, 16B, 16C, 16D show an example of a developing unit. They may be changed in material and structure without departing from the scope of the invention.

In the above illustrative embodiment, the laser light emitting portions 54 and the collimating lenses 55 are arranged in line in the sub scanning direction Y (in a vertical direction in FIG. 2). They may be arranged so that optical axes of laser beams emitted from the laser light emitting portions 54 are orthogonal to each other in plan view. In this case, an object that changes the direction of the optical axis, such as a reflective surface or mirror, may be disposed on the optical path of a laser beam to be emitted from one laser emitting portion 54, such that a direction of the optical axis of each laser beam becomes parallel before the laser beam enters the cylindrical lens 57.

The illustrative embodiment shows, but is not limited to, the aperture member 158 bent with an angle, as shown in FIG. 6, so that the surface 158C formed with the apertures 158A, 158B is generally perpendicular to the optical axis of each incident laser beam. However, the invention is not limited to such a shape that a surface formed with apertures is generally perpendicular to the optical axis of each incident laser beam. In addition, although the aperture member 158 is formed by bending at one place, it may be bent at one or more places as long as a surface formed with apertures is generally perpendicular to the optical axis of each incident laser beam.

Figure 8:
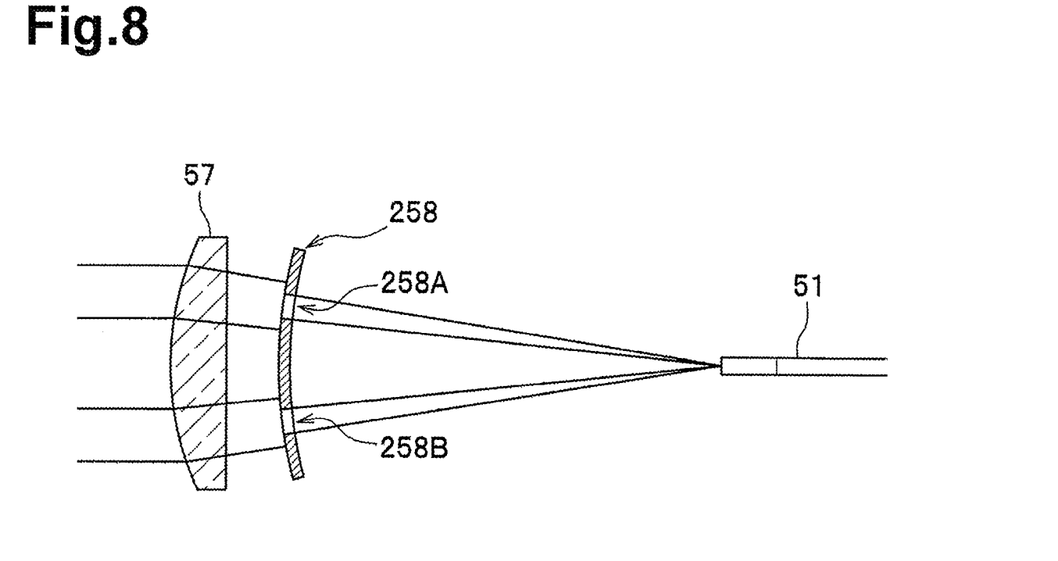
FIG. 8 is a cross sectional view of an aperture member and a cylindrical lens according to a second illustrative modification of the invention.

The illustrative modification shows, but is not limited to, the aperture member 258 that is arc-shaped in cross section, in which the arc is centered on an image formation point (not shown) of the cylindrical lens 57, as shown in FIG. 8. The aperture member 158 may be formed in any shape as long as at least portions around the apertures 158A, 158B are arc-shaped in cross section.

The above description shows, but is not limited to, variations of structure of the aperture member so that inner walls defining apertures can be formed generally parallel to the optical axis of each incident light beam. The aperture member may have the same shape as the aperture member 58 but with inner walls defining apertures being shaped parallel to the optical axis of each incident laser beam.

The above illustrative embodiment shows, but is not limited to, the aperture member 58 and the holding member 59 formed by metal-sheet working. The aperture member 58 and the holding member 59 may be formed by any forming method. In addition, the above illustrative embodiment shows, but is not limited to, the holding member 59 having a clip shape where it holds the cylindrical lens 57 therein. The holding member 59 may be formed in any shape.

While the features herein have been described in connection with various example structures and illustrative aspects, it will be understood by those skilled in the art that other variations and modifications of the structures and aspects described above may be made without departing from the scope of the invention. Other structures and aspects will be apparent to those skilled in the art from a consideration of the specification or practice of the features disclosed herein. It is intended that the specification and the described examples only are illustrative with the true scope of the inventions being defined by the following claims.

What is claimed is:

1. An optical scanning device configured to cause a light beam to scan a photosensitive drum to form a latent image on the photosensitive drum, the optical scanning device comprising:
   a first light emitting unit configured to emit a first light beam;
   a second light emitting unit configured to emit a second light beam;
   a light deflecting unit having deflecting surfaces and being configured to cause the first and second light beams emitted from the first and second light emitting units to reflect at the deflecting surfaces and deflect and scan in a main scanning direction;
   a cylindrical lens disposed between the first and second light emitting units and the light deflecting unit, the cylindrical lens being configured to cause the first and second light beams emitted from the first and second light emitting units to be directed along the main scanning direction to the deflecting surfaces;
   a holder configured to hold the cylindrical lens; and
   an aperture member disposed between the cylindrical lens and the light deflecting unit, the aperture member including a first portion and a second portion connected to each other at a connected position, the first portion having a first aperture and being shaped such that the first portion extends from the connected position toward a side opposite to the second portion with increasing distance from the cylindrical lens, the second portion having a second aperture and being shaped such that the second portion extends from the connected position toward a side opposite to the first portion with increasing distance from the cylindrical lens, the first aperture of the first portion being configured to regulate a width of the first light beam incident from the cylindrical lens at least in a sub scanning direction perpendicular to the main scanning direction, the second aperture of the second portion being configured to regulate a width of the second light beam incident from the cylindrical lens at least in the sub scanning direction.

2. The optical scanning device according to claim 1, wherein the first portion of the aperture member has a first inner wall defining the first aperture, the first inner wall being shaped parallel to an optical axis of the first light beam incident from the cylindrical lens.

3. The optical scanning device according to claim 2, wherein the aperture member includes portions around the first and second apertures, the portions around the first and second apertures being arc-shaped in cross section, in which the arc is centered on an image formation point of the cylindrical lens.

4. The optical scanning device according to claim 2, wherein the second portion of the aperture member has a second inner wall defining the second aperture, the second inner wall being shaped parallel to the optical axis of the second light beam incident from the cylindrical lens.

5. The optical scanning device according to claim 1, wherein a thickness of the aperture member satisfies the relationship:

$$t \cdot \sin\theta/w \leq 0.01$$

where t is the thickness of the aperture member, w is a width of the first or second aperture in the sub scanning direction, and θ is an incident angle between an optical axis of the first or second light beam incident from the cylindrical lens and a normal to a first or second surface in which the first or second aperture is formed.

6. The optical scanning device according to claim 1, wherein the aperture member is made of sheet metal.

7. The optical scanning device according to claim 1, wherein the holder has an opening through which the first and second light beams pass.

8. The optical scanning device according to claim 1,
   wherein the first portion of the aperture member is perpendicular to an optical axis of the first light beam incident from the cylindrical lens, and
   wherein the second portion of the aperture member is perpendicular to an optical axis of the second light beam incident from the cylindrical lens.

9. An optical scanning device configured to cause a light beam to scan a photosensitive drum to form a latent image on the photosensitive drum, the optical scanning device comprising:
   a light deflecting unit having deflecting surfaces; and
   at least one set of:
      a first light emitting unit configured to emit a first light beam toward the deflecting surfaces;
      a second light emitting unit configured to emit a second light beam toward the deflecting surfaces;
      a single cylindrical lens disposed between the first and second light emitting units and the light deflecting unit, the cylindrical lens being configured to cause the first and second light beams emitted from the first and second light emitting units to be directed linearly to the deflecting surfaces;
a holder configured to hold the cylindrical lens; and
an aperture member disposed between the cylindrical lens and the light deflecting unit, the aperture member including a first portion and a second portion connected to each other at a connected position, the first portion having a first aperture and being shaped such that the first portion extends from the connected position toward a side opposite to the second portion with increasing distance from the cylindrical lens, the second portion having a second aperture and being shaped such that the second portion extends from the connected position toward a side opposite to the first portion with increasing distance from the cylindrical lens, the first aperture of the first portion being configured to regulate a width of the first light beam incident from the cylindrical lens at least in a sub scanning direction, the second aperture of the second portion being configured to regulate a width of the second light beam incident from the cylindrical lens at least in the sub scanning direction,
wherein the light deflecting unit is configured to cause the first and second light beams emitted from the first and second light emitting units to reflect at the deflecting surfaces and deflect and scan in a main scanning direction perpendicular to the sub scanning direction.

10. The optical scanning device according to claim 9, wherein the aperture member is made of sheet metal.

11. The optical scanning device according to claim 9, wherein the holder includes a leaf spring.

12. An image forming apparatus comprising:
an optical scanning device comprising:
  a first light emitting unit configured to emit a first light beam;
  a second light emitting unit configured to emit a second light beam;
  a light deflecting unit having deflecting surfaces and being configured to cause the first and second light beams emitted from the first and second light emitting units to reflect at the deflecting surfaces and deflect and scan in a main scanning direction;
  a cylindrical lens disposed between the first and second light emitting units and the light deflecting unit, the cylindrical lens being configured to cause the first and second light beams emitted from the first and second light emitting units to be directed linearly to the deflecting surfaces; and
  an aperture member disposed between the cylindrical lens and the light deflecting unit, the aperture member including a first portion and a second portion connected to each other at a connected position, the first portion having a first aperture and being shaped such that the first portion extends from the connected position toward a side opposite to the second portion with increasing distance from the cylindrical lens, the second portion having a second aperture and being shaped such that the second portion extends from the connected position toward a side opposite to the first portion with increasing distance from the cylindrical lens, the first aperture of the first portion being configured to regulate a width of the first light beam incident from the cylindrical lens at least in a sub scanning direction perpendicular to the main scanning direction, the second aperture of the second portion being configured to regulate a width of the second light beam incident from the cylindrical lens at least in the sub scanning direction,
a first photosensitive member configured to be scanned by the first light beam emitted from first light emitting unit of the optical scanning device and to carry a first electrostatic latent image on a surface of the first photosensitive member;
a second photosensitive member configured to be scanned by the second light beam emitted from the second light emitting unit of the optical scanning device and to carry a second electrostatic latent image on a surface of the second photosensitive member;
a first developing device configured to develop the first electrostatic latent image into a first developer image;
a second developing device configured to develop the second electrostatic latent image into a second developer image;
a transfer unit configured to transfer the first and second developer images onto a recording sheet; and
a fixing unit configured to fix the first and second developer images onto the recording sheet.

13. The image forming apparatus according to claim 12, wherein the first portion of the aperture member of the optical scanning device has a first inner wall defining the first aperture, the first inner wall being shaped parallel to an optical axis of the first light beam incident from the cylindrical lens.

14. The image forming apparatus according to claim 13, wherein the second portion of the aperture member of the optical scanning device has a second inner wall defining the second aperture, the second inner wall being shaped parallel to the optical axis of the second light beam incident from the cylindrical lens.

15. The image forming apparatus according to claim 12, wherein the aperture member of the optical scanning device is made of sheet metal.

16. The image forming apparatus according to claim 12,
wherein the first portion of the aperture member of the optical scanning device is perpendicular to an optical axis of the first light beam incident from the cylindrical lens, and
wherein the second portion of the aperture member of the optical scanning device is perpendicular to an optical axis of the second light beam incident from the cylindrical lens.

* * * * *